3,532,001
PROTECTION MEANS FOR TELESCOPING
MEMBERS
Elman R. Dunn, Roscoe, Ill., assignor to
Litton Industries, Inc.
Filed July 15, 1968, Ser. No. 744,714
Int. Cl. F16j 15/50
U.S. Cl. 74—18.2
11 Claims

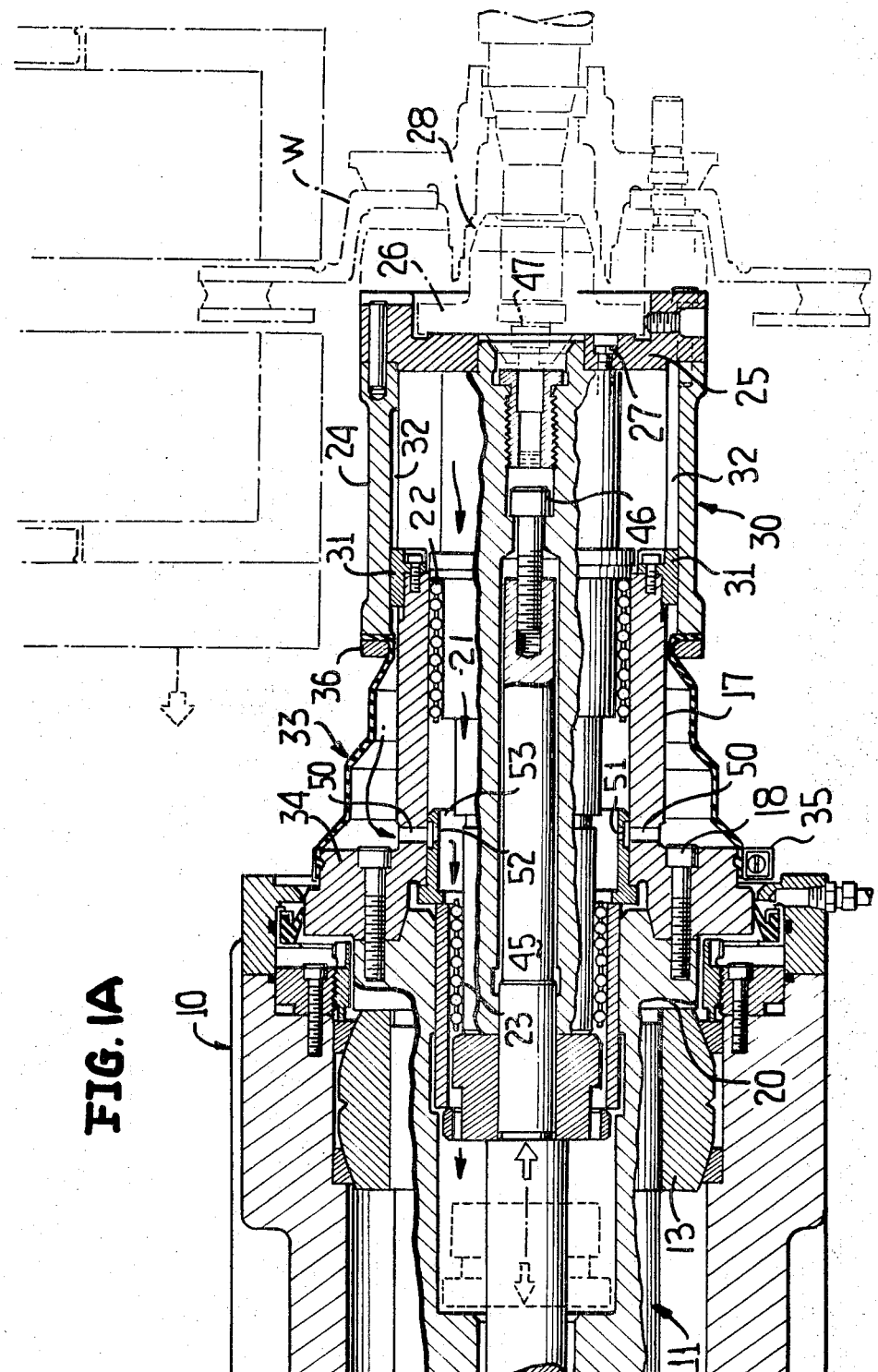
Oct. 6, 1970 — E. R. DUNN — 3,532,001
PROTECTION MEANS FOR TELESCOPING MEMBERS
Filed July 15, 1968 — 2 Sheets-Sheet 2
FIG. IA
MATCH FIG. 1
INVENTOR
ELMAN R. DUNN
BY
Mason, Porter, Diller & Brown
ATTORNEYS United States Patent Office 3,532,001
Patented Oct. 6, 1970

ABSTRACT OF THE DISCLOSURE

This disclosure relates to a headstock spindle which includes telescoping members having coacting surfaces protected by a flexible sleeve, and means to control the displacement of air contained within the construction upon relative telescopic movement of the telescoping members. The air displaced by the telescoping members upon the contraction thereof is conducted to a receiving chamber which expands so that the sleeve is not inflated by the displaced air, while expansion of the telescoping members transfers air from the receiving chamber into the sleeve and the increasing volume of the telescoping members as the latter expand.

Figure 1:
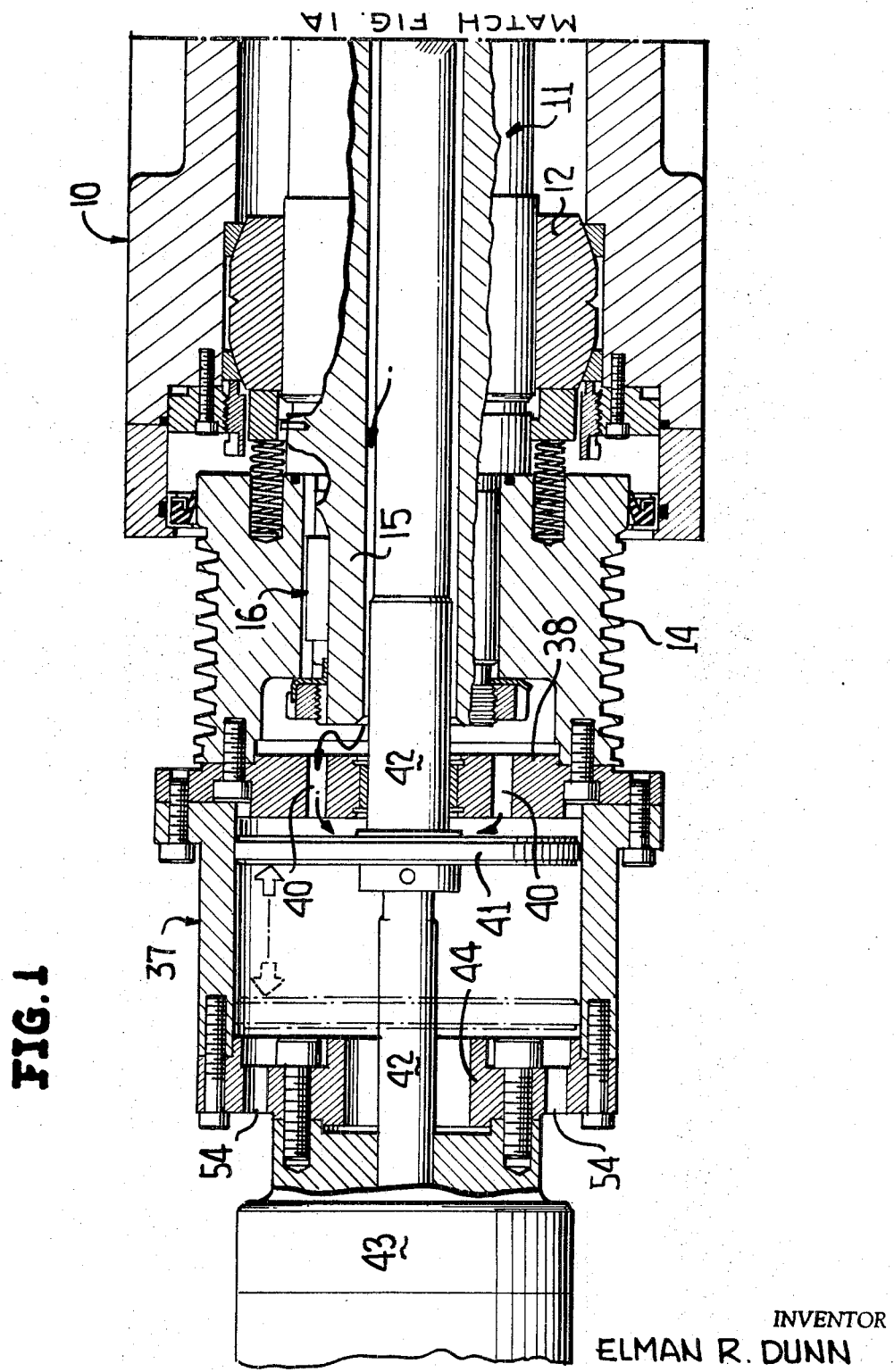

This invention relates to a machine tool having telescoping members in a live spindle headstock, and more particularly, to a novel and improved apparatus for controlling the volume of displaced air caused by axial dislacement either in expanding or contracting modes of operation of the telescopic members.

In machines of the type to which this invention is directed it is desirable to protect the coacting surfaces of the telescoping members by a flexible boot or sleeve. In similar conventional applications the flexible sleeve is provided with an air vent to eliminate extremes of pressure within the flexible sleeve as the telescoping members are expanded or contracted. However, the air vent necessarily destroys the intended purpose of the flexible sleeve, namely, to prevent dirt or other contaminants from contacting the coacting surfaces of the telescoping members. It should also be appreciated that if the flexible sleeve were not vented it would be subjected to excessive wear due to the continued inflation and deflation by the air entrapped within the sleeve as the telescoping members are axially displaced.

It is, therefore, a primary object of the present invention to provide novel means for avoiding the inflation and deflation of a protective flexible sleeve to thereby increase the sleeve-life in the absence of air vents in the sleeve which would subject the coacting surfaces of the telescoping members to contaminated air which is necessarily drawn into conventionally vented sleeves by the expansion of the telescoping members.

In the drawings:

FIGS. 1 and 1A are matching axial sectional views through a spindle headstock of this invention, and illustrate the manner in which air is displaced between a chamber defined by the sleeve, the telescoping members themselves, and a displacement cylinder.

In accordance with this invention, a stationary housing 10 of a grinding machine (not shown) houses a live headstock spindle 11 which is preferably rotatably supported within the housing 10 by bearings 12 (FIG. 1) and 13 (FIG. 1A). The spindle 11 is driven through suitable connections from a motor (not shown) through a spindle pulley 14 (FIG. 1) which is fixed to a reduced end portion 15 of the spindle 11 by a key and keyway connection 16.

A spindle extension 17 (FIG. 1A) in the form of a tubular member is secured in a conventional manner by bolts 18 to a flange 20 of the spindle 11. The spindle extension 17 provides means for supporting an arbor 21 which is reciprocally mounted in ball reciprocating bearings 22 and 23 to provide reciprocal movement to a tubular driving sleeve 24 which carries a driving head 25. A work supporting member 26 is removably supported in the driving head 25 by a series of set screws and retaining screws 27. The work supporting member 26 includes a tapered nose 28 for receiving and supporting a workpiece W. The arbor 21, the driving sleeve 24 and the driving head 25 are assembled to form a telescoping unit 30 which is united to the tubular member 17 by a plurality of keys 31 and keyways 32.

A flexible boot or sleeve 33 surrounds the spindle extension 17 and is clamped to the outer periphery of a flange 34 thereof by a conventional clamping band 35. The opposite end of the sleeve 33 is similarly conventionally clamped to a radial face (unnumbered) of the driving sleeve 24 by a clamping band 36 and a plurality of bolts (unnumbered) which are threaded into axial threaded bores (not shown) of the driving sleeve 24. The sleeve 33 is imperforate, that is, it does not include vent openings and therefore will protect the coacting surfaces of the telescoping tubular members 17, 24 from contaminants, coolants, etc. Ordinarily, the unvented sleeve 33 would be inflated and deflated by the air displaced as the telescoping unit 30 is respectively contracted and expanded. Furthermore, the expansion and contraction of sleeve 33 would result in the compression of the air contained in the sleeve in its expanded condition. However, in accordance with this invention, the inflation and deflation of the sleeve 33 is avoided by means of a displacement cylinder 37 (FIG. 1) which draws air from the interior of the sleeve 33 upon the contraction of the tubular members 17, 24 while upon the extension of the tubular members air is displaced from the cylinder 37 into the volume or chamber between the sleeve 33 and extension 17.

The displacement cylinder 37 is secured to the pulley 14 through an adapter plate 38 having a plurality of passages 40 opening into the right-hand end of the cylinder 37 in which is housed a piston 41. The piston 41 is secured to a piston rod 42 of a hydraulic motor 43 which is attached to the cylinder 37 by means of a plate 44. The fluid motor 43 rotates with the cylinder 37 and the pulley 14 and is therefore provided with a rotary joint union (not shown) to permit the introduction and withdrawal of fluid into the cylinder 43 during the rotation thereof. The introduction of the hydraulic fluid into the hydraulic motor 43 to one side of a piston (not shown) therein will move the piston rod 42 to the right while the introduction of hydraulic fluid to an opposite side of the piston of the hydraulic motor 43 will draw the piston rod 42 to the left.

The piston rod 42 is connected at a reduced end portion 45 (FIG. 1A) to the arbor 21 by a bolt 46. The arbor 21 is in turn also connected to the driving head 25 and the supporting member 26 by a bolt 47. Due to the latter two described connections any reciprocal movement imparted to the piston rod 42 will axially displace the driving sleeve 24 relative to the spindle extension 17.

The chamber between the arbor 21 and the sleeve 24, as well as the space between the sleeve 33 and the spindle extension 17, is placed into fluid communication with the displacement cylinder 37 by means of a plurality of ports 50 in the extension 17 which are in alignment with a circumferential groove 51 and a plurality of ports 52 in a sleeve 53, as well as additional passages which will be described immediately hereafter in conjunction will the following description of the operation of the apparatus.

Assuming that the telescoping unit 30 is in the fully extended position, as shown in FIG. 1A, hydraulic fluid is introduced into the hydraulic motor 43 through the rotary joint heretofore noted to draw the piston rod 42 to the left as viewed in FIG. 1. As the piston rod 42 moves to the left, the piston 41 is likewise moved in a similar direction and any air to the left of the piston 41 is vented to atmosphere through apertures 54 in the plate 44. The volume to the right of the piston 41 is thereby progressively increased as the tubular member 24 is drawn to the left by the piston rod 42 and the arbor 21. This causes a reduction of the volume defined by the tubular members 17, 24 as well as a reduction in the volume of the sleeve 33. Air will therefore flow from both the interior of the tubular members 17, 24 and the sleeve 33 along the path indicated by the unnumbered headed arrows in FIGS. 1 and 1A until eventually reaching the interior of the displacement cylinder 37 to the right of the piston 41 through the ports or passages 40. Thus, upon contraction of the telescoping unit 30, the resultant decrease in volume thereof is compensated for by an inverse increase in the volume of the cylinder 37 which draws air from sleeve 33 and the telescoping unit 30, and thus prevents the imperforate or unvented sleeve 33 from being inflated or from having to compress the air which it contains in its expanded condition.

Likewise, if the piston 41 is in the phantom outline position of FIG. 1 and the hydraulic motor 43 is operated to move the piston rod 42 to the right, the air to the right of the piston 41 is displaced and forced to flow along the same flow path indicated by the unnumbered headed arrows but in an opposite direction resulting in the introduction of air into the sleeve 33 and the space provided as the tubular member 24 moves to the right relative to the member 17. This prevents destructive deflation of the sleeve 33. Thus, upon the movement of the piston 41 in either direction, the sleeve 33 is neither deflated nor inflated thereby resulting in an increased or prolonged life of the sleeve 33, and the entrance of environmental airborne contaminants thru ordinary venting practice is avoided.

While preferred forms and arrangements of parts have been shown in illustrating the invention, it is to be clearly understood that various changes in details and arrangement of parts may be made without departing from the spirit and scope of this disclosure.

I claim:

1. An apparatus comprising a pair of rotatable telescopically united members, a flexible imperforate sleeve surrounding at least a portion of an inner one of said members to protect an exterior surface thereof from contaminants, a first chamber defined between said sleeve and said exterior surface the volume of which varies in dependence upon relative axial displacement of said members, means placing said first chamber in fluid communication with the interior of said telescopic members, and means in fluid communication with said interior for preventing inflation and deflation of said sleeve due to relative axial displacement of said telescopic members by respectively introducing and removing air from said interior and said first chamber upon a respective increase and decrease in the volume of said interior.

2. The apparatus as defined in claim 1 including means for rotating said members, said introducing and removing means includes a second chamber in fluid communication with said first-mentioned chamber, and means for varying the volume of said second chamber in inverse relationship to variations in volume of said first-mentioned chamber.

3. The apparatus as defined in claim 1 wherein said introducing and removing means includes a second chamber in fluid communication with said first-mentioned chamber, a piston in said chamber, and means for moving said piston in opposite directions to vary the volume of said second chamber in inverse relationship to variations in volume of said first-mentioned chamber.

4. The apparatus as defined in claim 1 wherein said introducing and removing means includes a second chamber in fluid communication with said first-mentioned chamber, a piston in said chamber, means for moving said piston in opposite directions to vary the volume of said second chamber in inverse relationship to variations in volume of said first-mentioned chamber, and said displacing means and moving means are one and the same.

5. The apparatus as defined in claim 1 wherein said introducing and removing means includes a second chamber in fluid communication with said first-mentioned chamber, a piston in said chamber, means for moving said piston in opposite directions to vary the volume of said second chamber in inverse relationship to variations in volume of said first-mentioned chamber, said displacing means and moving means are one and the same, and means for rotating said members.

6. The apparatus as defined in claim 1 wherein said inner member is tubular, and said introducing and removing means is a port placing said chamber in fluid communication with the interior of said inner member.

7. The apparatus as defined in claim 1 wherein said introducing and removing means includes a second chamber, means for varying the volume of said second chamber in inverse relationship to variations in volume of said first-mentioned chamber, passage means for placing said chambers in fluid communication, and said passage means are defined in part by a port in said inner member opening into said first-mentioned chamber.

8. The apparatus as defined in claim 1 wherein said pair of telescopic members are tubular, a piston in said second chamber, a piston rod connected between said piston and an exterior one of said members, and said displacing means includes means for moving said piston rod to both vary the volume of the second chamber in response to axial displacement of the telescopic members, and relatively axially displace the telescopic members.

9. The aparatus as defined in claim 8 wherein said introducing means includes a port placing the first-mentioned chamber in fluid communication with the interior of the inner tubular member.

10. The apparatus as defined in claim 9 including means for rotating said telescopic members in unison.

11. An apparatus comprising a pair of rotatable telescopically united members, a first chamber defined by said telescoping members, the volume of which varies in dependence upon relative axial displacement of said members, displacement means including a portion positively connected to and movable in the same direction with one of said telescoping members for receiving fluid displaced by said telescoping members, said portion of said displacement means being further operable upon movement of said one telescoping member in an opposite direction to return said fluid to said first chamber, said displacement means being further defined by a housing defining a second chamber in unrestricted fluid communication with said first chamber for receiving therefrom and returning thereto the fluid in the absence of an increase in internal pressure, and said displacement means, including said housing and movable portion, being devoid of valve means.

References Cited

UNITED STATES PATENTS

| 2,944,639 | 7/1960 | Blake | 74—18 XR |
| 3,027,152 | 3/1962 | Deschner | 74—18.2 XR |
| 3,101,131 | 8/1963 | Bourcier DeCarson et al. | 74—18.2 XR |
| 3,421,377 | 1/1969 | Wittig | 74—18.2 |

FOREIGN PATENTS

| 3,058 | 11/1884 | Great Britain. |

FRED C. MATTERN, JR., Primary Examiner

F. D. SHOEMAKER, Assistant Examiner